Sept. 12, 1939.                T. B. POWERS                  2,172,451
                              AMUSEMENT RIDE
                          Filed Nov. 14, 1936              2 Sheets-Sheet 2
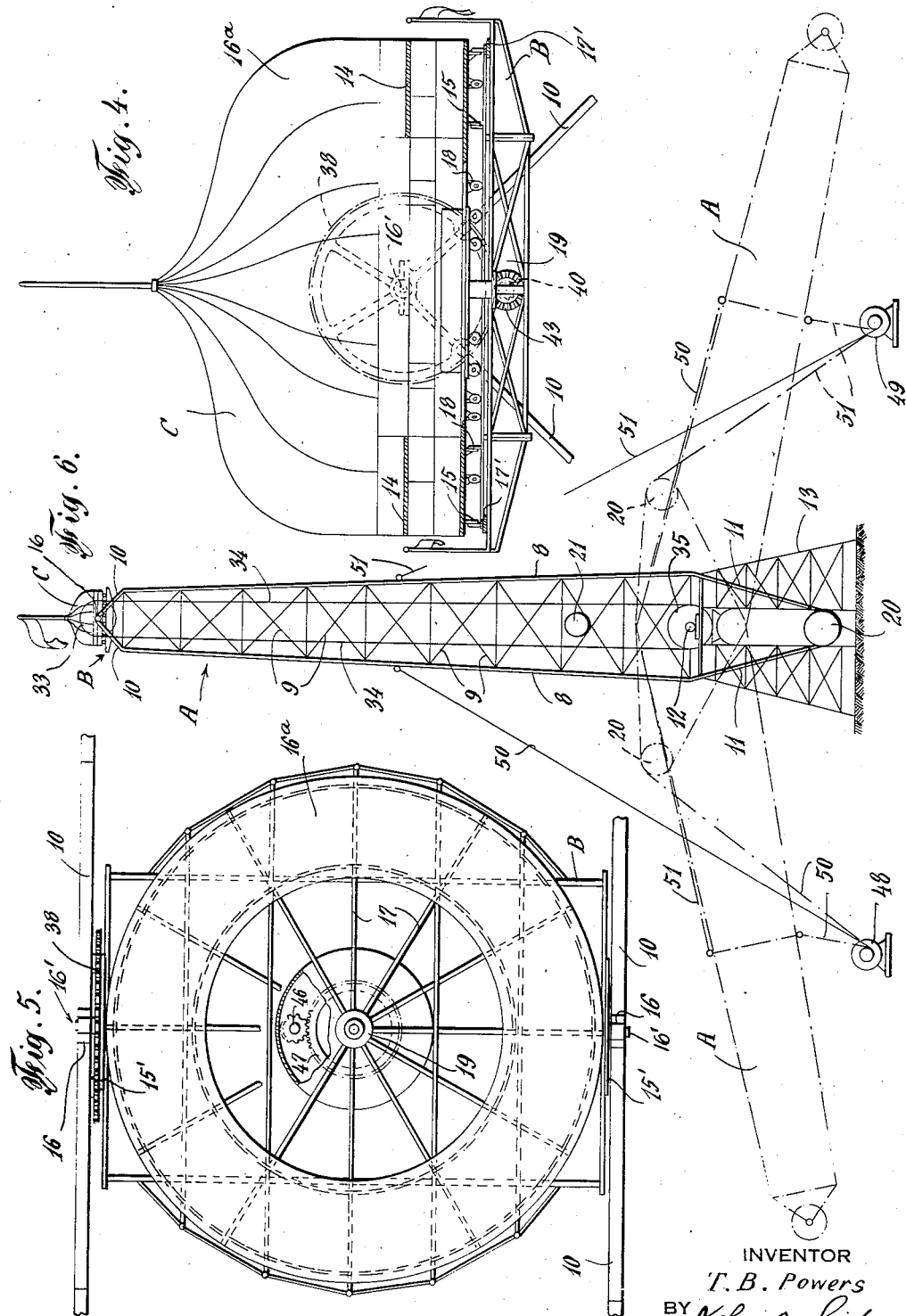
INVENTOR
*T. B. Powers*
BY *John O. Seifert*
ATTORNEY Patented Sept. 12, 1939

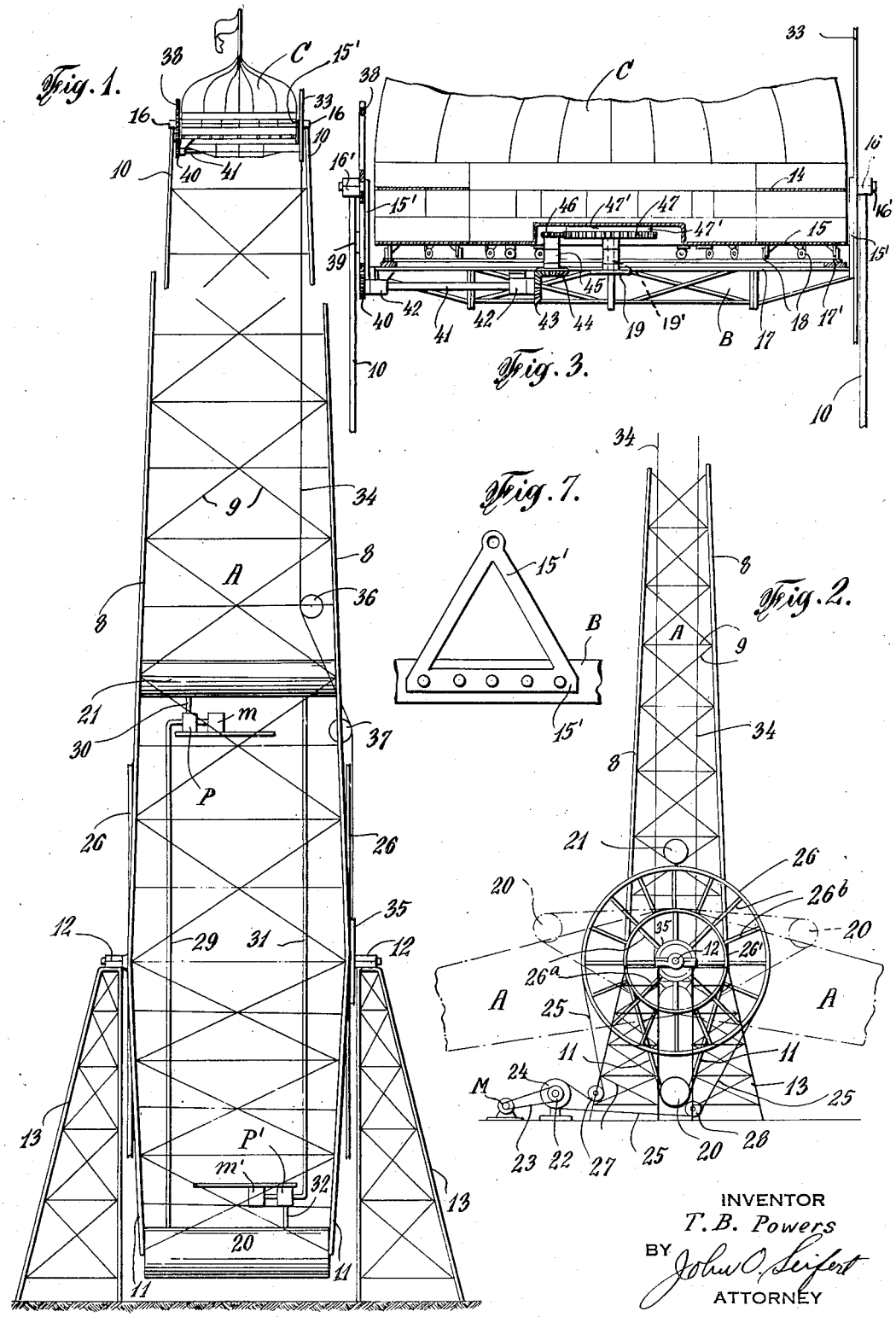

2,172,451

UNITED STATES PATENT OFFICE 2,172,451

AMUSEMENT RIDE

Timothy B. Powers, St. George, N. Y.

Application November 14, 1936, Serial No. 110,798

3 Claims. (Cl. 272—36)

This invention relates to improvements in passenger transporting devices or rides, and it is an object of the invention to provide an improved passenger carrying and transporting apparatus particularly adapted as an amusement ride.

It is a further object of the invention to provide an improved amusement ride comprising a combined passenger transporting device and observation tower.

It is another object of the invention to provide an improved amusement ride including a pivotally supported tower adapted to be moved in a vertical plane to and from a vertical position and supporting a passenger carrier to have pivotal movement on a horizontal axis parallel of the axis of the pivotal support of the tower, whereby the passenger carrier is adapted to assume a horizontal position in all positions of the tower, and the provision of means to rotate the passenger carrier in a horizontal plane.

It is a further object of the invention to provide an amusement ride including a tower pivotally supported to have movement on a horizontal axis in a vertical plane to and from a vertical position, and the tower carrying a passenger carrier to have movement on a horizontal axis and have rotation about a vertical axis, together with means to move the tower to and retain it in vertical position, and means to move the tower to position to extend substantially in a horizontal position from its pivotal support.

It is another object of the invention to provide an improved amusement ride including a tower pivotally supported to have movement about a horizontal axis to and from vertical position and supporting a passenger carrier to have movement about a horizontal axis and to be rotated about a vertical axis, and means operative by the movement of the tower to and from vertical position to adjust the passenger carrier about a horizontal axis and maintain the same substantially in horizontal position and simultaneously impart rotative movement to the passenger carrier about a vertical axis.

It is another object of the invention to provide an improved amusement ride including a tower pivotally supported to have movement about a horizontal axis to and from vertical position and supporting a passenger carrier, and the tower provided with counterweight means at the end opposite at which it the passenger carrier is supported and being of a weight to move the tower to vertical position with the passenger carrier positioned above the pivotal support of the tower, and power means to move the tower against said counterweight means from vertical position to position to extend substantially horizontally from its pivotal support.

In the drawings accompanying and forming a part of this application Figure 1 is a front elevation of an amusement ride embodying the invention.

Figure 2 is a side elevation with the upper portion of the tower removed and showing in dot and dash lines the different positions to which the tower is adapted to be moved from the vertical.

Figure 3 is a transverse sectional view of a passenger carrier constituting a part of the apparatus and showing the means for mounting the same upon the tower to have movement about a horizontal axis and rotative movement about a vertical axis.

Figure 4 is a side elevation, partly in section, of the passenger carrier shown in Figure 3 looking at the left thereof.

Figure 5 is a plan view of the passenger carrier with the roof or canopy portion removed and showing the means to support the carrier on the tower to have movement about a horizontal axis, and partly broken away to show the means to impart rotative movement to the carrier about a vertical axis.

Figure 6 is a side elevation of the tower and showing modified means to move the tower from vertical position to substantially horizontal or below horizontal position; and Figure 7 is a detail view of the means to pivotally mount the support for the carrier on the tower.

In carrying out the embodiment of the invention illustrated in the drawings there is provided a tower A substantially of rectangular form in cross section and built up of structural steel including corner members 8 of angle or other suitable form in cross section, the corner members being connected by suitable transverse bracing and trussing members 9 similar to bridge construction to secure the desired size and strength of the tower. The corner members 8 at each side of the tower and one end of the tower to constitute the top of the tower converge toward each other, as shown at 10 in Figure 6, and such corner members 8 at the opposite end to constitute the bottom of the tower converging toward each other, as at 11. The tower is pivotally supported intermediate the transverse center of the tower and the lower or base end thereof to have rotative movement on a horizontal axis extending transversely of the tower, and shown as effected by trunnions fixed to and extending laterally from opposite sides of the tower engaging heavy journal boxes 12 fixed on piers 13, shown as constructed of structural steel, although they may be constructed of reinforced concrete, and whereby the tower is suspended from and to have movement between the piers on a horizontal axis in a vertical plane to and from vertical and horizontal positions.

A passenger carrier, shown in a general way at C, is supported at the top of the tower to have movement on a horizontal axis extending transversely of the tower and rotative movement about the vertical axis of the carrier. The passenger carrier may be of any desired structure and is shown as provided with two superposed passenger carrying platforms 14, 15, and may have a roof or canopy portion 16a. To permit of movement of the passenger carrier about a horizontal axis extending transversely of the tower there is provided a support for the carrier pivotally suspended within the tower from the connected ends of the converging portions 10 of the corner members 8 of the tower, and shown as comprising a cradle including a body or base, shown in a general way at B, suspended at the opposite sides from the top of the connected ends of the converging portions 10 of the corner members 8 of the tower by hangers 15' (Figure 7) of triangular form fixed to the cradle base at and with an angle portion extending parallelly of the side of the cradle base. To mount said hangers on the converging ends of the portions 10 a trunnion 16' is fixed in and extends laterally from the apex of each of the hangers and is engaged in bearing boxes connected to the ends of the converging portions 10 of the corner members 8 of the tower, as at 16, or studs may be fixed to and extended inwardly from the connected ends of the converging portions 10 and upon which studs the cradle hangers 15' may be pivotally engaged. The cradle base is provided with a series of arms 17 extending radially from a hub member 19 fixed centrally of the cradle and said arms carrying at the outer ends a circular track 17' upon which the passenger carrier is supported by wheels rotatably mounted on carriers therefor fixed to the bottom of the passenger carrier, as at 18.

To connect the passenger carrier to the cradle base to have rotative movement about the vertical axis of the passenger carrier and substantially in the plane of the longitudinal axis of the tower on the circular track 17', a stud 19' fixed to and extending downwardly from the passenger carrier engages in the hub 19.

The tower is adapted to be moved to and normally maintained in position with the passenger carrier supporting end extending vertically upward above the pivotal support of the tower. For this purpose the lower or base end of the tower is provided with counterweight means to arrange said end of the tower of greater weight than the passenger carrier supporting end of the tower with passengers in the carrier, whereby the base end of the tower is adapted to assume a position by gravity below the pivotal support of the tower on the piers 13. While various forms of counterweight means may be adapted for this purpose it is shown as comprising a tank 20 for a liquid, such as water, supported by the converging portions 11 of the corner members of the tower to extend transverse of the base end of the tower.

To move the tower from its vertical position to horizontal position, or to position below the horizontal, against the counterweight means 20, as shown in dot and dash lines in Figure 2, and the passenger carrier positioned relative to stations (not shown) for loading and unloading passengers from the passenger carrier, power means is provided and operatively connected to the tower. As shown in Figure 2 this power means comprises a combined electric motor and speed reducing and reversing means M operatively connected to a shaft 22 by a belt or chain 23 engaged about a wheel fixed to the drive shaft of the motor means and a pulley on the shaft 22. A pair of wheels 24 fixed on and spaced along the shaft 22 are operatively connected to the tower by cables 25 engaged about said wheels 24 and having one or more turns about wheels 26 fixed to opposite sides of the tower concentric with the pivotal support thereof, and adapted to travel over idler wheels 27, 28, the wheels 27 preferably being adjustable to take up slack in the cables. The wheels 26 each comprise an inner annular member 26' carried by spokes 26a radiating from a hub, and an outer rim engaged by the cables 25 is carried by the inner rim 26' by spokes 26b fixed to and extending radially from said inner or annular member 26'.

To compensate for varying loads of the passenger carrier C means are provided to vary the weight of the counterweight means, and shown as comprising an auxiliary tank 21 for carrying liquid supported by and extending transversely of the tower intermediate the pivotal support thereof 12 and the top of the tower to which the liquid is adapted to be transferred from the tank 20, or from said tank 21 to the tank 20. This transferring of the liquid from one tank to the other tank is effected when the tower is in a substantially horizontal position and is effected by suitable pumps, and shown as of the rotary type in a conventional manner at P, P' operated by electric motors, shown in a conventional manner at m, m', mounted upon the tower. The intake of pump P is connected by a pipe 29 to the tank 20 and the outlet thereof is connected by a pipe 30 to the tank 21, and the intake of pump P' is connected by a pipe 31 to the tank 21 and the outlet connected by a pipe 32 to the tank 20. The motors are connected with a source of electricity and suitable switch mechanism is provided to control the operation of the motors m, m'. The weight of the counterweight means relative to the passenger carrier supporting end of the tower is such that the counterweight means will move the tower slowly to a vertical or upright position with the passenger carrier supporting end of the tower above the pivotal support of the tower, and should the load of the passenger carrier be so light so that the counterweight means will effect a quick movement of the tower to vertical position a portion of the liquid in the tank 20 is transferred to the tank 21. However, should the load of the passenger carrier be greater than the weight of the counterweight means so that the counterweight means will not effect movement of the tower to vertical position a portion of the liquid in the tank 21 is transferred to the tank 20.

The passenger carrier supporting cradle is adapted to assume a horizontal position in all positions of the tower in its movement to and from the vertical and the horizontal, and to assure the tower assuming and maintaining the same in such position in all positions of the tower a wheel 33 is loosely mounted on the trunnion support of a cradle hanger 15' and fixed to said cradle hanger, as shown at the right in Figures 1 and 3, and rotation of said wheel is effected and thereby adjustment of the passenger carrier supporting cradle about a horizontal axis by and proportional to the movement of the tower from and to its vertical position by a cable 34 engaged about said wheel 33 and a wheel 35 fixed concentric of the pivotal support of the tower, the cable in its travel about wheels 33, 35 passing over guide wheels 36, 37 rotatably carried by the tower. By the movement of the tower from its vertical upright position to horizontal position movement will be imparted to the cable 34 relative to the wheel 35 and by engagement of the cable about the wheel 33 rotative movement in one direction will be imparted to said wheel 33 and by its connection with the passenger carrier supporting cradle rotative movement about a horizontal axis will be imparted to said cradle and the passenger carrier carried thereby and thus move the passenger carrier to and maintain it substantially in a horizontal position. When the tower is moved from horizontal position to vertical upright position the cradle with the passenger carrier will be adjusted in reverse direction to and maintained in horizontal position in all positions of the tower.

Means are provided to effect rotative movement of the passenger carrier in a horizontal plane about the cradle track 17', and while this may be effected by suitable means independent of the movement of the tower, such movement of the passenger carrier is preferably effected by and from the movement of the tower. For this purpose a gear 38 is mounted concentrically of a trunnion support for the cradle, and shown as arranged concentrically of the trunnion support for the cradle at the side of the cradle opposite the wheel 33. The gear 38 is held against rotation with the cradle by fixing the same to the converging portions 10 of the corner members 6 of the tower, as shown at 39. The gear 38 meshes with a pinion 40 fixed on an end of a shaft 41 journaled in bearings 42 carried by the cradle, said shaft 41 being operatively connected to the passenger carrier by a bevel pinion 43 fixed on the opposite end of the shaft 41 meshing with a bevel gear 44 fixed to a vertical shaft in a bearing, as at 45, and a pinion 46 on said shaft meshing with a gear 47 fixed at one side to the passenger carrier, as at 47', concentrically of the pivot stud in the bearing hub 19 on the cradle. As the cradle with the passenger carrier is moved on the horizontal pivot support for the cradle by the movement of the tower to and from its vertical upright position through the cradle connection of the wheels 33, 35 the pinion 40 will travel around the gear 38 and thereby rotate the shaft 41 and through the gear train connection of said shaft 41 with the passenger carrier the latter is rotated and travels on the circular track 17' about the vertical axis of the carrier.

In Figure 6 there is shown modified means for moving the tower from its vertical upright position against the counterweight means to horizontal positions, as shown in dot and dash lines, which may comprise electric motor operated winches, as shown in a conventional manner at 48 and 49. The tower is connected to the winch drums by cables 50, 51, each cable being connected at one end to a winch drum and the opposite end of one cable is connected to one side of the tower and the opposite end of the other cable is connected to the opposite side of the tower. When it is desired to move the tower from its vertical position in a direction so that the tower will extend in a substantially horizontal position from one side of the pivotal support of the tower, as from the left thereof, the winch 48 is operated to wind the cable 50 thereon and the other cable is permitted to unwind from the drum of winch 49 and assume a position as shown in dot and dash line. When it is desired to move the tower from its vertical upright position to extend substantially horizontally from the opposite side of the pivot support of the tower the winch 49 is operated to wind the cable 51 on the drum thereof and the cable 50 is permitted to unwind from the drum of winch 48 and assume a position substantially as shown in dot and dash lines.

To control and regulate the movement of the tower from horizontal to vertical position imparted thereto by the counterweight means, suitable brake mechanism is provided and is preferably arranged to co-operate with the motor shaft to retard the rotation thereof.

Having described my invention, I claim:

1. In an amusement ride, a tower pivotally supported to have movement in a vertical plane, a passenger carrier suspended from the upper end of the tower, and variable counterweight means operative to actuate the tower about its pivot support to move the passenger carrier suspending end of the tower to extend vertically above the pivot support of the tower, comprising a pair of liquid carrying tanks, one tank mounted on the tower at the side of its pivot support opposite the passenger carrier suspending end adapted to contain liquid sufficient in quantity and weight to actuate the tower about its pivot support to move the passenger carrier suspending end of the tower to position to extend vertically above the pivot support of the tower, and the other tank mounted on the tower at the side of its pivot support from which the passenger carrier is suspended, and means to connect the tanks and transfer liquid from one tank to the other tank.

2. In an amusement ride, a tower pivotally supported intermediate the transverse center and base end thereof to have movement in a vertical plane on a horizontal axis, a passenger carrier supported at the top end of the tower to have movement on an axis horizontally of the carrier and to have rotative movement about the vertical axis thereof, means connected to the passenger carrier and the tower operatively connected to transmit the movement of the tower to the passenger carrier on its horizontal pivot support to and retain it in substantially horizontal position in all positions of the tower, means fixed on the tower, and means carried by the passenger carrier cooperating with said means fixed on the tower to transmit the movement of the tower to rotative movement of the passenger carrier about the vertical axis thereof.

3. In an amusement ride, a tower pivotally supported intermediate the ends thereof to have movement in a vertical plane on a horizontal axis, a passenger carrier supported by the tower to have movement on an axis horizontally of the tower and to have rotative movement about the vertical axis thereof, a wheel fixed to the carrier concentrically of its horizontal pivotal support, a wheel fixed concentric of the pivot support of the tower, a cable engaging about said wheels and operative from the movement of the tower to transmit the movement of the tower to rotative movement of the wheel fixed to the carrier and the carrier about its horizontal pivot support, a gear fixed to the tower concentric of the horizontal pivot support of the carrier, a gear fixed to the carrier concentric of the vertical axis thereof, and a gear train operatively connecting said gears fixed on the tower and carrier to transmit the movement of the tower to rotative movement of the carrier about its vertical axis.

TIMOTHY B. POWERS.